United States Patent

Koistinen et al.

[19]

[11] Patent Number: 5,770,020
[45] Date of Patent: *Jun. 23, 1998

[54] DISTILLATION APPARATUS

[75] Inventors: Peter Koistinen, Espoo; Reijo Rantala, Laitila, both of Finland

[73] Assignee: Keeran Corporation N.V., Geneva, Switzerland

[*] Notice: The term of this patent shall not extend beyond the expiration date of Pat. No. 5,512,141.

[21] Appl. No.: 751,416

[22] Filed: Nov. 18, 1996

Related U.S. Application Data

[63] Continuation of Ser. No. 75,471, filed as PCT/FI91/00388 Dec. 16, 1991, abandoned.

[30] Foreign Application Priority Data

Dec. 14, 1990 [FI] Finland ..................................... 906170

[51] Int. Cl.[6] .............................. B01D 1/22; B01D 1/28; B01D 3/00
[52] U.S. Cl. ........................... 202/172; 202/176; 202/177; 202/182; 202/236; 202/267.1; 159/13.3; 159/24.1; 159/28.6; 159/43.1; 159/DIG. 15; 165/166; 203/23; 203/26; 203/72; 203/86
[58] Field of Search .................................... 202/182, 205, 202/176, 267.1, 236, 172, 177; 203/26, 23, 86, 72, DIG. 4, 84; 159/28.6, 43.1, 24.1, 24.2, 13.1, 13.3, DIG. 15, DIG. 41; 165/166

[56] References Cited

U.S. PATENT DOCUMENTS

| | | | |
|---|---|---|---|
| 3,161,574 | 12/1964 | Elam | 203/86 |
| 3,227,630 | 1/1966 | Beckman | 203/86 |
| 3,438,432 | 4/1969 | Wetch et al. | 203/86 |
| 4,076,576 | 2/1978 | Marttala . | |
| 4,235,281 | 11/1980 | Fitch et al. | 165/165 |
| 4,341,601 | 7/1982 | Hantig | 203/26 |
| 4,361,469 | 11/1982 | Trutna | 202/158 |
| 4,511,436 | 4/1985 | Din Nasser | 202/236 |
| 4,585,523 | 4/1986 | Giddings | 202/236 |
| 5,211,812 | 5/1993 | Vielberth et al. | 202/236 |
| 5,340,443 | 8/1994 | Heiniö et al. | 203/DIG. 22 |
| 5,512,141 | 4/1996 | Koistinen et al. . | |

FOREIGN PATENT DOCUMENTS

| | | |
|---|---|---|
| 0034920 | 9/1981 | European Pat. Off. . |
| 0314261 | 5/1989 | European Pat. Off. . |

(List continued on next page.)

OTHER PUBLICATIONS

Office Action dated May 4, 1994 of application serial No. 08/075,499, filed Aug. 16, 1993.

(List continued on next page.)

Primary Examiner—Virginia Manoharan
Attorney, Agent, or Firm—Loeb & Loeb LLP

[57] ABSTRACT

The invention relates to a distillation apparatus (1) which is suitable in particular for the distillation of sea water into fresh water. The apparatus includes a plurality of flat, bag-like elements (3) formed from a thin film material such as plastic film and placed one against the other, the elements serving as heat exchangers between a vaporizing liquid flowing along the exterior surfaces of the element and a condensing vapor directed to the inside of the element, and a compressor (15) for increasing the pressure and temperature of the generated vapor before it is directed to the inside of the elements. The essential idea of the invention is that at the upper end of each bag-like element (3) there is a honeycomb-structured end strip (4) having substantially the width of the element, the strip containing parallel feeding ducts (26) separated from each other by partition walls, the ducts distributing the liquid to be evaporated over the entire width of the element surface. In addition, the strip (4) may contain ducts (25), formed in the same manner, which direct the vapor to be condensed to the inside of the element over the entire width of its end. At the lower end of the element there may additionally be a honeycomb-structured end strip (7), the ducts contained therein collecting the produced distillate into a collection vessel (8) and discharging any unvaporized liquid into a collection basin (9).

17 Claims, 2 Drawing Sheets

FOREIGN PATENT DOCUMENTS

| | | |
|---|---|---|
| 1519742 | 3/1970 | Germany . |
| 2638339 | 3/1977 | Germany . |
| 127038 | 4/1973 | Norway . |
| 338059 | 8/1971 | Sweden . |
| 422366 | 3/1982 | Sweden . |
| 2120950 | 12/1983 | United Kingdom . |
| WO8802282 | 4/1988 | WIPO . |
| 9001977 | 3/1990 | WIPO . |

OTHER PUBLICATIONS

Australian Office Action dated Feb. 22, 1994 for Australian application corresponding to U.S. application serial No. 08/075,499, filed Aug. 16, 1993.

PCT International Search Report for PCT International application corresponding to co–pending application serial No. 08/075,499, filed Aug. 16, 1993.

International Preliminary Examination Report for PCT International application corresponding to co–pending application serial No. 08/075,499, filed Aug. 16, 1993.

PCT Written Opinion for PCT International application corresponding to co–pending application serial No. 08/075,499, filed Aug. 16, 1993.

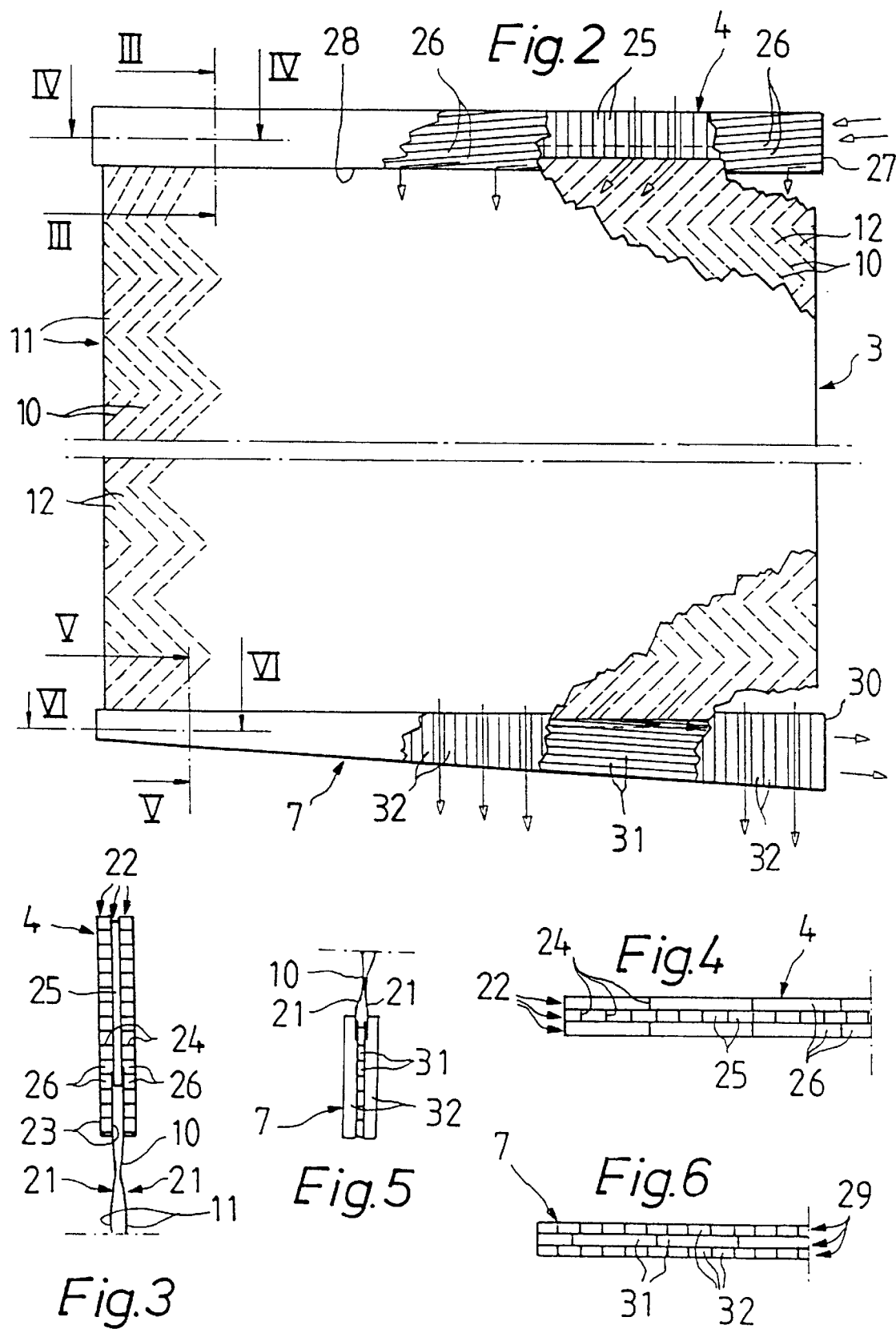

DISTILLATION APPARATUS

This is a continuation of application Ser. No. 08/075,471, filed as PCT/FI91/00388 Dec. 16, 1991, now abandoned.

BACKGROUND OF THE INVENTION

The present invention relates to a distillation apparatus for the evaporation of a liquid and for its subsequent condensation, the apparatus comprising a plurality of flat, bag-like elements of a thin film material, such as plastic film, placed one against the other, the elements serving as heat exchangers between a vaporizing liquid which flows along the exterior surfaces of the elements and a condensing vapor which has been directed to the inside of the elements, and a compressor for increasing the pressure and temperature of the generated vapor before it is directed to the inside of the elements. A distillation apparatus according to the above definition is described in, for example, FI Lay-Open Print 79948 and in the corresponding International Application Publication WO 90/01977. The primary use of distillation apparatuses of this type has been the production of fresh water from sea water. The tube or plate heat exchangers used in the prior art for the distillation of sea water were susceptible to contamination, and the corrosive nature of sea water caused problems of corrosion in them, necessitating the use of expensive, non-corrodible materials such as titanium and cupro-nickel. By the use of bag-like distillation elements made of plastic film these disadvantages have been eliminated, since plastic film is inexpensive, non-corrodible and, owing to its resilience, less susceptible to contamination. Any contaminant possibly adhering to the membranes can be shaken off by varying the pressure prevailing inside the elements. It has been possible to compensate for the poor thermal conductivity of plastic per se by using in the distillation apparatus a very thin film and a large number of thin elements having a large heat exchange surface.

The distillation apparatus according to said FI Lay-Open Print 79948 comprises, above the plastic membrane elements, a common distribution basin for the water to be evaporated, from which the liquid flows via pipes into the passages between the elements. The vapor generated on the exterior surfaces of the elements is directed to a blower, which blows it, at a higher pressure and temperature, to the inside of the elements through apertures in their sides. The system described has the disadvantage that the vaporizing liquid cannot be caused to spread very evenly over the element surfaces, part of the potential evaporation efficiency of the apparatus thus being left unexploited. Also, in the apparatus described, the spreading out of the blown vapor inside the elements does not take place in the best possible manner. Thus, heat exchange between the liquid vaporizing on the exterior surfaces of the elements and the vapor condensing inside the elements remains incomplete.

SUMMARY OF THE INVENTION

The object of the present invention is to provide a distillation apparatus in which heat exchange is enhanced particularly by causing the liquid which is to be evaporated to spread more evenly than in prior art over the exterior surfaces of the elements. The invention is characterized in that at the upper end of each bag-like element there is a honeycomb-structured end strip having substantially the width of the element, the strip containing parallel feeding ducts separated from each other by partition walls, the ducts distributing the liquid to be evaporated over the entire width of the element surface.

According to one preferred embodiment of the invention, the honeycomb-structured end strip comprises a honeycomb board in which the space between two opposite walls is divided by transverse, mutually parallel partition walls into parallel ducts of equal width. Such a plastic honeycomb board is a commonly available commercial product, which has so far been used in various support and insulation structures in which the ducts have constituted voids serving as insulation and making the structure lighter. In the present invention, however, they serve as a simple and inexpensively produced flow-channel system, which spreads the liquid evenly over the membrane surfaces of the elements and is not susceptible to the corrosive action of the liquids being distilled.

Especially when sea water is distilled to produce drinking water it is preferable that the liquid-feeding ducts contained in the end strip of the element should begin at one end of the strip and be oriented from there obliquely down to the side of the strip, from where the distribution of the liquid onto the exterior surface of the element takes place. The liquid vessel from which the feeding ducts of the various elements begin can in this case be located at the side of the end strips. The orientation of the feeding ducts can be achieved simply by cutting the end strip out of a larger honeycomb board made up of two opposite walls and mutually parallel partition walls between them, the cut being at a suitable angle relative to the said partition walls.

One preferred embodiment of the invention is characterized in that the end strip of an element comprises a honeycomb in which the space between two opposite walls is divided into parallel ducts feeding the liquid to be evaporated onto the exterior surface of the element, and in which the adjacent space between two parallel walls is divided into parallel ducts feeding the vapor to be condensed to the inside of the element. By this system there is accomplished simultaneously both a maximally even distribution of the liquid to be evaporated over the exterior surface of the element and a maximally even distribution of the vapor to be condensed inside the element, thus accomplishing the best possible heat exchange between the condensing vapor and the vaporizing liquid.

The most preferred embodiment of the system referred to above is that the honeycomb constituting the end strip has, on both sides of the vapor-feeding ducts leading to the inside of the element, feeding ducts which distribute the liquid to be evaporated onto both exterior surfaces of the element. The advantage gained by this is that the efficiency of the evaporation will not be dependent on the film surfaces of adjacent elements being precisely one against the other; liquid will spread onto all film surfaces even if the elements in the apparatus are located slightly apart from each other.

In addition to the honeycomb-structured end strips at the upper ends of the elements, the distillation apparatus according to the invention may also have at the lower end of each element a honeycomb-structured end strip having substantially the width of the element, the end strip containing parallel ducts for removing any liquid which has remained unvaporized. For the end strip of the lower end of the element it is also possible to use commercially available plastic honeycomb boards in which the space between two opposite walls is divided by transverse, mutually parallel partition walls into parallel ducts of equal width.

The end strip at the lower end of the element is preferably made up of a honeycomb in the middle of which the space between two walls is divided into parallel outlet ducts for the liquid condensed inside the element and in which, on both sides of the said space, the spaces between opposite walls are divided into outlet ducts for the liquid which has remained unvaporized on the exterior surfaces of the element. The outlet ducts for the condensed liquid, which constitutes the distillate obtained, may be oriented towards a common collection space on the side of the elements, whereas the outlet ducts for unvaporized liquid are preferably vertical, in which case they will discharge the liquid to the bottom of the apparatus by the shortest route. Vertical, sufficiently wide liquid outlet ducts may be necessary, especially when the apparatus is used for the concentration of suspensions, such as waste waters from bleaching in pulp mills, thus avoiding the risk that the solids present in the suspension will clog the ducts.

BRIEF DESCRIPTION OF THE DRAWINGS

The invention is described below in greater detail with the help of examples, with reference to the accompanying drawings, in which FIG. 2 depicts a side view of one bag-like element belonging to the distillation apparatus according to FIG. 1, FIG. 3 depicts a section through III—III in FIG. 2, FIG. 4 depicts a section through IV—IV in FIG. 2, FIG. 5 depicts a section through V—V in FIG. 2, and FIG. 6 depicts a section through VI—VI in FIG. 2.

DESCRIPTION ON THE PREFERRED EMBODIMENTS

Figure 1:
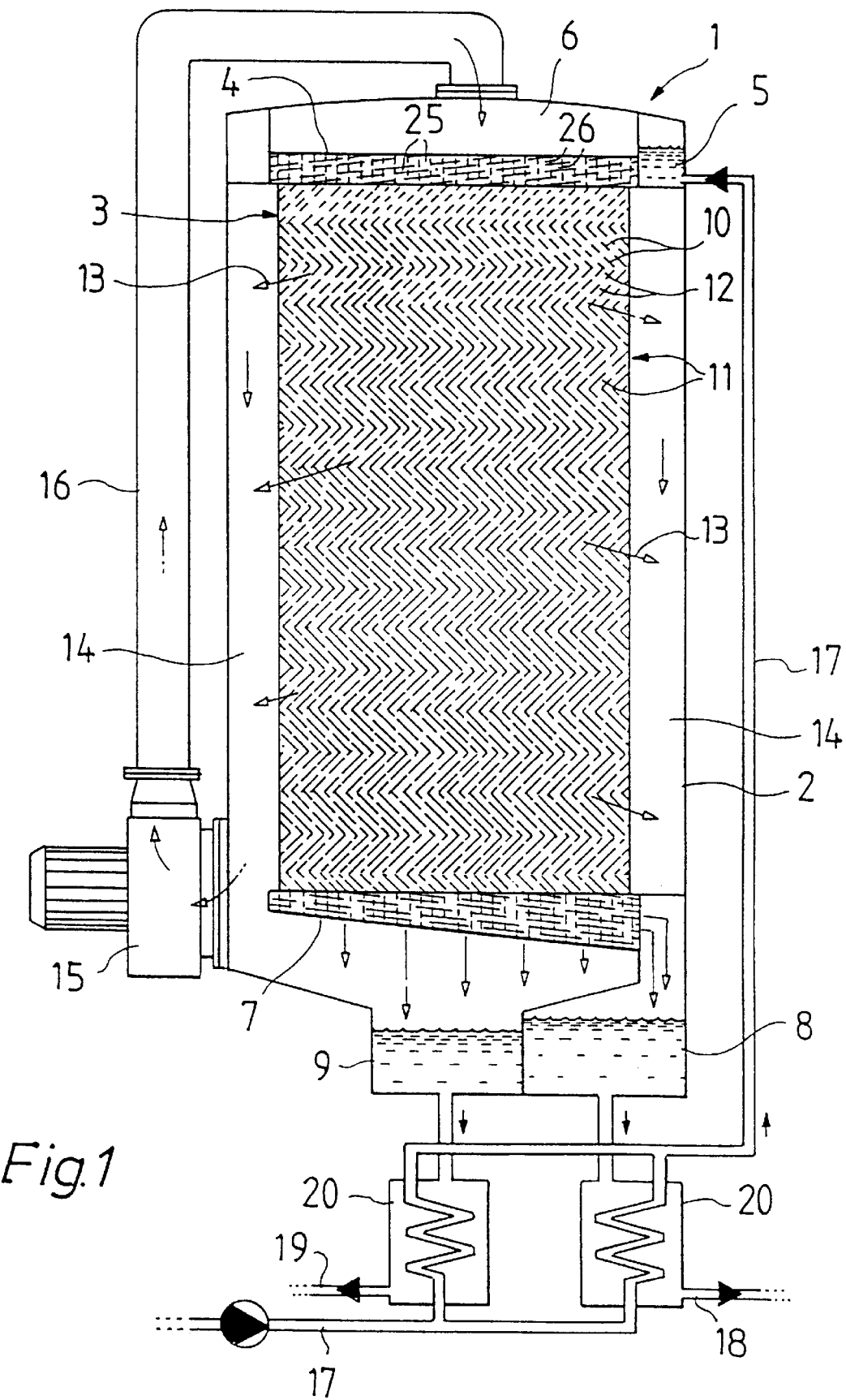
FIG. 1 depicts a schematic cross section of one distillation apparatus according to the invention.

The distillation apparatus according to FIG. 1 comprises a frame 2 in the space defined by which there is a plurality of flat, bag-like elements 3 made of thin plastic film, placed one against the other. At the upper end of each element 3 there is a honeycomb-structured plastic end strip 4, one end of which communicates with a distribution basin 5 containing the liquid to be evaporated, common to all the elements, and its upper side communicates with the feeding chamber 6 containing the vapor to be condensed, also common to all the elements. At the lower end of each element 3 there is a honeycomb-structured plastic end strip 7, one end of which communicates with a collection vessel 8 for the distillate condensed from the vapor, and under which the bottom of the frame has been formed into a collection basin 9 for the liquid which has remained un-vaporized in the apparatus. Between the said end strips 4 and 7, each bag-like element 3 is made up of two opposite plastic membranes 11 which have been welded to each other along vertical zigzagging seaming lines 10. The seaming lines 10 delimit, inside the element 3, vertical ducts 12 extending from one end of the element to the other, in which ducts the vapor condenses into liquid. The seaming lines 10 are not continuous but include breaks at which vapor or liquid may to a limited degree pass from one duct 12 to another. The vapor generated from the liquid fed onto the exterior surfaces of the elements 3 flows from the spaces between the elements, in accordance with arrows 13 in FIG. 1, into a suction chamber 14 surrounding the elements, from which chamber a blower 15 serving as the compressor blows the vapor, at a higher pressure and temperature, via a pipe 16 into the vapor-feeding chamber 6 at the upper end of the apparatus.

The inlet pipe for the liquid to be distilled, which leads to the distribution basin 5, is indicated by reference numeral 17 in FIG. 1. The outlet pipe for the distillate obtained is indicated by numeral 18, and the outlet pipe for the unvaporized liquid by numeral 19. The discharging distillate and the liquid which has remained unvaporized are used in heat exchangers 20 for preheating the liquid to be distilled.

The structure and operation of each individual element 3 of the distillation apparatus 1 can be seen in greater detail in FIGS. 2–6. The function of the end strip 4 at the upper end or the element is to distribute the vapor to be condensed, blown into the feeding chamber 6, as evenly as possible into the vertical ducts 12 inside the element and to distribute the liquid to be evaporated, which is in the distribution basin 5, as evenly as possible onto the opposite exterior surfaces 21 of the element. The function of the end strip 7 at the lower end of the element, for its part, is to collect the liquid condensed in the ducts 12 inside the element and to direct it as the obtained distillate to the collection vessel 8 and to allow the liquid which has remained unvaporized on the element surfaces 21 to flow into the collection basin 9 at the bottom of the apparatus.

The upper end strip 4 of the element comprises, in accordance with FIGS. 2–4, a honeycomb produced from three opposite, substantially rectangular plastic honeycomb boards 22. In each of these boards 22 the space between two opposite walls 23 is divided by transverse, mutually parallel partition walls 24 into parallel ducts of mutually equal width. The ducts in the middle honeycomb board of the strip form the ducts 25 leading to the inside of the element, for the vapor to be condensed, and the ducts in the honeycomb boards on their both sides constitute the feeding ducts 26, leading to the opposite exterior surfaces 21 of the element, for the liquid to be evaporated. As can be seen in FIG. 2, the feeding ducts 25 for the vapor to be condensed are vertical, in which case they direct the vapor vertically into the ducts 12 produced inside the element by means of seams, whereas the feeding ducts 26 for the liquid to be evaporated run obliquely from the end side 27 of the strip 4 to the bottom side 28 of the strip, from which the liquid discharges onto the element surfaces 21. Both the vapor directed to the inside of the element 3 and the liquid directed onto its surfaces 21 can thus be distributed evenly over the entire width of the element, whereby the best possible heat exchange is accomplished between the vapor phase and the liquid phase.

The honeycomb-structured end strip 7 at the lower end of each element is structurally similar to the end strip 4 of the upper end of the element. There is, however, the difference that, of the three opposite honeycomb boards 29 of the strip 7, the middle one contains ducts 31 which lead obliquely towards the end 30 of the strip, communicate with the vertical ducts 12 seamed inside the element, and serve as outlet ducts for the liquid or condensable formed inside the element, whereas in the honeycomb boards on both sides of the ducts 32 are vertical and serve as outlet ducts for the liquid remaining unvaporized.

For an expert in the art it is evident that the various embodiments of the invention are not restricted to the above example but may vary within the scope of the accompanying claims. It is, for example, advantageous if the vertical zigzagging ducts 12 in adjacent elements run cross-wise in relation to each other, in which case the elements will not adhere to each other and the downward-flowing liquid to be evaporated will remain more evenly distributed on the exterior surfaces 21 of the elements. If the elements 3 are identical, this requires the reversal of every second element, in which case the liquid-distribution basin 5 and the distillate-collection vessel 8 in the apparatus must be connected to both ends of both the upper end strips 4 and the lower end strips 7.

We claim:

1. A distillation apparatus comprising:
   a housing having a vapor feeding chamber:
      a plurality of vertically disposed heat exchange elements within the housing, each of the heat exchange elements having an upper end, a lower end and two side ends, and having an evaporating surface and a condensing surface, the condensing surface communicating with the vapor feeding chamber; and
      an upper end ducted strip extending across the heat exchange elements; the upper end strip defining one end side adjacent one of the two side ends of the heat exchange element and a bottom side transverse to the one end side, the bottom side of the strip being coupled to the upper end of the heat exchange elements;
      the upper end strip having a plurality of first sets of vertical vapor feed ducts coupling the vapor feeding chamber to the condensing surface of each of the heat exchange elements, and a plurality of second sets of liquid feed ducts communicating with the evaporating surface of each of the heat exchange elements; and
   the first sets of vapor feed ducts and the second sets of liquid feed ducts being disposed alternately with each other wherein liquid applied to an evaporating surface forms a vapor leaving an unvaporized remaining liquid and a vapor applied to a condensing surface forms a condensate.

2. A distillation apparatus according to claim 1, wherein the second sets of liquid feed ducts have inlets at the end side of the upper end strip and discharge outlets at the bottom side of the upper end strip so that the liquid feed ducts are oriented obliquely downward from the end side to the bottom side of the upper end strip, the discharge outlets being arranged along the width of the heat exchange elements and communicating with the evaporating surface of the heat exchange elements.

3. A distillation apparatus according to claim 1, wherein two opposing condensing surfaces define a condensing space, the condensing space being divided into a plurality of condensing ducts, and wherein each of the vertical vapor feed ducts communicates with each condensing duct.

4. A distillation apparatus according to claim 3, wherein the two opposing condensing surfaces comprise two opposing plastic membranes, the opposing plastic membranes being welded to each other along vertical zigzag seam lines to define a first plurality of parallel zigzag vapor feed ducts.

5. A distillation apparatus according to claim 4, wherein a second plurality of parallel zigzag vapor feed ducts adjacent to the first plurality of parallel zigzag vapor feed ducts run cross-wise in relation to each other.

6. A distillation apparatus according to claim 4, wherein the seam lines are non-continuous and include breaks for allowing vapor or condensate to pass from one duct to another.

7. A distillation apparatus according to claim 1, wherein the liquid feed ducts are arranged along substantially the entire width of the heat exchange element for distributing the liquid over the entire width of the evaporating surfaces of the heat exchange elements.

8. In a distillation apparatus for the evaporation of liquid and for its subsequent condensation, the apparatus having a vapor feeding chamber; a plurality of generally vertically extending flat, bag-like heat exchange elements formed of thin film material, the heat exchange elements having exterior surfaces for evaporating vaporizing liquid, interior spaces for condensing vapor generated from the liquid, and an upper end, the heat exchange elements being placed one against the other; means for directing vaporizing liquid along the exterior surfaces of the heat exchange elements; a compressor for increasing the pressure and temperature; and means coupled to the compressor for directing the vapor into the interior spaces of the heat exchange elements, the improvement comprising:
   a cellular-structured end strip having substantially the width of the bag-like heat exchange elements and provided at the upper end of each bag-like heat exchange element, the end strip having a top side, a bottom side opposing the top side and two opposing end sides between the top side and the bottom side,
   the end strip having parallel liquid-feeding ducts for directing a flow of vaporizing liquid and partition walls for spacing the liquid-feeding ducts from each other, the liquid-feeding ducts having inlets and discharge outlets provided along the bottom side of the end strip and positioned below the inlets of the liquid feeding ducts, said liquid feeding ducts being oriented obliquely so that the vaporizing liquid flows downwardly from the inlets to the discharge outlets, said outlets being arranged along substantially the entire width of the heat exchange elements for distributing the vaporizing liquid over substantially the entire width of the exterior surfaces of the heat exchange elements.

9. A distillation apparatus according to claim 8, wherein said parallel liquid-feeding ducts are of equal width.

10. A distillation apparatus according to claim 8 or claim 9, wherein said end strip is made of plastic.

11. A distillation apparatus according to claim 8 or claim 9, wherein the end strip has a top side, a bottom side opposing the top side and two opposing end sides between the top side and the bottom side, and the liquid-feeding ducts have inlets at one of the end sides of the strip and discharge outlets at the bottom side so that the liquid-feeding ducts are oriented obliquely downward from said one of the end sides to the bottom side.

12. A distillation apparatus according to claim 11, further comprising a common liquid vessel provided on said one of the end sides of the end strips and wherein the inlets of the liquid-feeding ducts are connected to a common liquid vessel provided on said one of the end sides of the end strips.

13. A distillation apparatus according to claim 8, wherein the end strip has a first space including a plurality of said liquid-feeding ducts for feeding the vaporizing liquid onto the exterior surfaces of the heat exchange elements and a second space disposed adjacent the first space, the second space including a plurality of second parallel ducts for feeding the vapor into the interior spaces of the heat exchange elements.

14. A distillation apparatus according to claim 13, wherein the second space is sandwiched between two of the first spaces.

15. A distillation apparatus for the evaporation of liquid and for its subsequent condensation, the apparatus having a vapor feeding chamber; a plurality of flat, bag-like heat exchange elements formed of thin film material, the heat exchange elements having exterior surfaces for evaporating vaporizing liquid, interior spaces for condensing vapor generated from the liquid, and an upper end, the heat exchange elements being placed one against the other; means for directing vaporizing liquid along the exterior surfaces of the heat exchange elements; a compressor for increasing the pressure and temperature; and means coupled to the compressor for directing the vapor into the interior spaces of the heat exchange elements, the improvement comprising:

a cellular-structured end strip having substantially the width of the bag-like heat exchange elements and provided at the upper end of each bag-like heat exchange element;

the end strip having parallel liquid-feeding ducts and partition walls for spacing the liquid-feeding ducts from each other, the liquid-feeding ducts obliquely arranged along substantially the entire width of the heat exchange elements for distributing the vaporizing liquid over substantially the entire width of the exterior surfaces of the heat exchange elements, wherein each of the heat exchange elements has a lower end, and further comprising a lower cellular-structured end strip coupled to the lower end of the heat exchange element, the lower cellular-structured end strip having substantially the width of the element and having a plurality of parallel outlet ducts communicating with the exterior surface of the heat exchange element for discharging unvaporized liquid.

16. A distillation apparatus according to claim 15, wherein the lower end strip at the lower end of the heat exchange element comprises a plastic board having two opposite walls defining a space therebetween, the space being divided by transverse, mutually parallel partition walls into parallel ducts of equal width.

17. A distillation apparatus according to claim 15 or 16, wherein the end strip at the lower end of the heat exchange element has a middle space, the middle space being divided into parallel outlet ducts communicating with the interior space of the heat exchange element for discharging condensate and two side spaces sandwiching the middle space therebetween, each of the spaces communicating with the exterior surface of the heat exchange element and being divided into outlet ducts for discharging the unvaporized liquid.

* * * * *